(12) United States Patent
Kim (10) Patent No.: US 11,910,396 B2
(45) Date of Patent: Feb. 20, 2024

(54) ELECTRONIC DEVICE AND METHOD FOR NOTIFYING EMERGENCY OF VEHICLE

(71) Applicant: THINKWARE CORPORATION, Seongnam-si (KR)

(72) Inventor: Daewon Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 20 days.

(21) Appl. No.: 17/517,787

(22) Filed: Nov. 3, 2021

(65) Prior Publication Data

US 2022/0141806 A1 May 5, 2022

(30) Foreign Application Priority Data

Nov. 3, 2020 (KR) .................. 10-2020-0145596
Nov. 2, 2021 (KR) .................. 10-2021-0148746

(51) Int. Cl.
*H04W 72/23* (2023.01)
*H04W 72/56* (2023.01)
*H04W 72/54* (2023.01)
*G07C 5/00* (2006.01)
*H04W 72/563* (2023.01)

(52) U.S. Cl.
CPC ............ *H04W 72/23* (2023.01); *G07C 5/008* (2013.01); *H04W 72/54* (2023.01); *H04W 72/563* (2023.01)

(58) Field of Classification Search
CPC ... H04W 72/042; H04W 72/06; H04W 72/08; G07C 5/008
See application file for complete search history.

(56) References Cited

U.S. PATENT DOCUMENTS

| 5,157,610 | A | * | 10/1992 | Asano | ............... G07C 5/008 |
| 2010/0093304 | A1 | * | 4/2010 | Miyoshi | ............... H04L 5/0007 |
| 2020/0154428 | A1 | * | 5/2020 | Takeda | ............... H04L 27/2636 |
| 2021/0368438 | A1 | * | 11/2021 | Li | ............... H04W 52/028 |

* cited by examiner

*Primary Examiner* — Ronald B Abelson
(74) *Attorney, Agent, or Firm* — WHDA, LLP (57) ABSTRACT

A first electronic device comprises a communication circuitry, and a memory configured to store instructions, and at least one processor coupled with the communication circuitry; wherein the at least one processor is configured to receive, from a second electronic device that is an upper node of the first electronic device, information regarding a specified waveform; while detecting that a vehicle associated with the first electronic device is not in an emergency state after receiving the information, transmit, to the second electronic device, a signal based on resources allocated from the second electronic device; and in response to detecting that the vehicle is in the emergency state alter receiving the information, transmit, to the second electronic device, a signal with the specified waveform independently from the allocated resources, wherein the signal with the specified waveform includes information for notifying that the vehicle is in the emergency state.

20 Claims, 3 Drawing Sheets

ELECTRONIC DEVICE AND METHOD FOR NOTIFYING EMERGENCY OF VEHICLE

CROSS-REFERENCE TO RELATED APPLICATION(S)

This application claims the benefit under 35 U.S.C. § 119(a) of Korean patent applications filed in the Korean Intellectual Property Office on Nov. 3, 2020, and Nov. 2, 2021, respectively, and assigned Serial Nos. 10-2020-0145596 and 10-2021-0148746, the disclosure of which is incorporated by reference herein in its entirety.

BACKGROUND

Field

Various embodiments described below relate to an electronic device and method for detecting emergency.

Description of Related Art

With the development of information and communication technology (ICT), electronic devices embedded in vehicles or detachably attached to the vehicles have been developed. The electronic device may communicate with at least one other electronic device by including at least one communication circuit. The at least one other electronic device for executing communication with the electronic device may be a base station, or may be a server, and may be a user equipment such as the electronic device.

SUMMARY

An electronic device embedded in a vehicle or detachably attached to the vehicle may be used to notify an accident of the vehicle when an accident of the vehicle occurs. For example, the electronic device may notify the accident of the vehicle by transmitting a message for indicating that the accident of the vehicle occurs to another electronic device.

Meanwhile, in general, an upper node (e.g., base station) of the electronic device may allocate a resource for a signal transmitted from the electronic device to the electronic device, and the electronic device may transmit the signal to the upper node by using the allocated resource. Since the allocation of such resources requires bidirectional signaling, it ma not be suitable for an emergency situation such as an accident of the vehicle.

The technical problems to be achieved in this document are not limited to those described above, and other technical problems not mentioned herein will be clearly understood by those having ordinary knowledge in the art to which the present disclosure belongs, from the following description.

A first electronic device according to various embodiments may comprise a communication circuitry, and a memory configured to store instructions, and at least one processor operatively coupled with the communication circuitry; wherein the at least one processor may be, when the instructions are executed, configured to receive, from a second electronic device that is an upper node of the first electronic device, information regarding a specified waveform; while detecting that a vehicle associated with the first electronic device is not in an emergency state after receiving the information, transmit, to the second electronic device, a signal based on resources allocated from the second electronic device; and in response to detecting that the vehicle is in the emergency state after receiving the information, transmit, to the second electronic device, a signal with the specified waveform independently from the allocated resources, wherein the signal with the specified waveform includes information for notifying that the vehicle is in the emergency state.

The electronic device and method according to various embodiments can notify that an accident of a vehicle related to the electronic device occurs with high reliability and low latency, by transmitting a Tx signal haying a specified Waveform without using resources allocated from the upper level.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The terms used in the present disclosure are used only to describe specific embodiments and may not be intended to limit the scope of other embodiments. The singular expression may include the plural expression unless the context clearly dictates otherwise. Terms used herein, including technical or scientific terms, may have the same meaning as those generally understood by those with ordinary knowledge in the technical field described in this disclosure. Among the terms used in this disclosure, terms defined in general dictionary may be interpreted in the same or similar meaning as the context of the relevant technology and may not be interpreted in an ideal or excessively formal meaning unless clearly defined in this disclosure. In some cases, even terms defined in the present disclosure cannot be interpreted to exclude embodiments of the present disclosure.

In various embodiments of the present disclosure described below, a hardware approach method will be described as an example. However, since various embodiments of the present disclosure include technologies that use both hardware and software, various embodiments of the present disclosure do not exclude software-based approaches.

Figure 1:
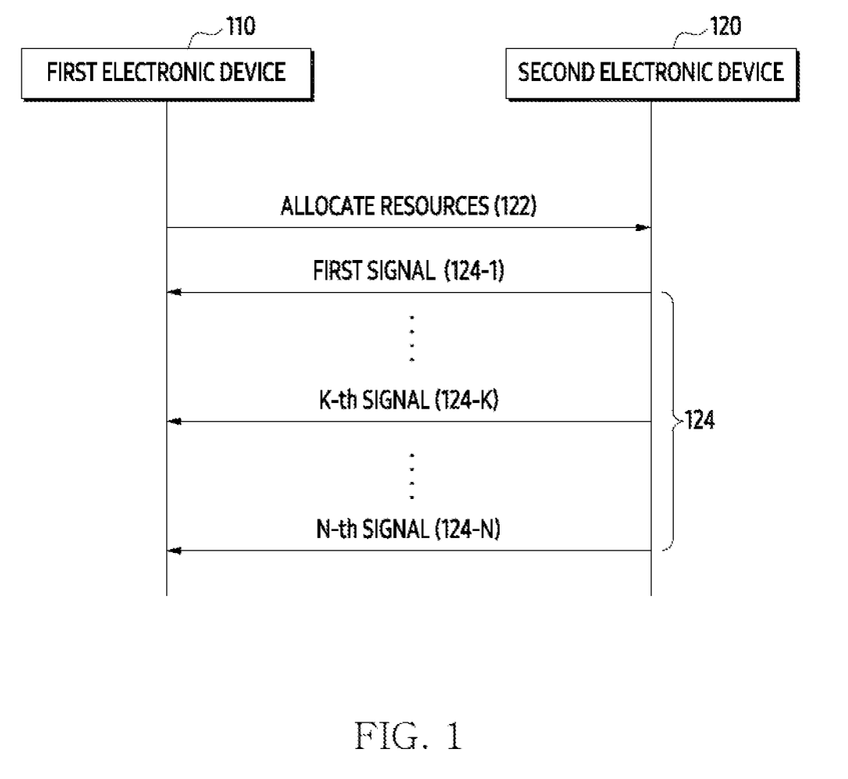
FIG. 1 illustrates an example of resource allocation-based signaling.

FIG. 1 illustrates an example of resource allocation-based signaling.

The first electronic device 110 may perform communication with the second electronic device 120. For example, the first electronic device 110 may support communication with the second electronic device 120 to support communication between the second electronic device 120 and another electronic device as an upper node of the second electronic device 120. For example, the first electronic device 110 may be a base station, an access point (AP), or the like.

The second electronic device 120 may be related to a moving vehicle. For example, the second electronic device 120 may be a device (e.g., head unit) embedded in the vehicle. As another example, the second electronic device 120 may be a device detachably attached to the vehicle (e.g., smartphone, tablet, etc.). As another example, the second electronic device 120 may be a device possessed by a passenger of the occupant of the vehicle. However, it is not limited thereto.

In various embodiments, the second electronic device 120 may be a lower node of the first electronic device 110. In various embodiments, the second electronic device 120 may use the first electronic device 110 to transmit a signal to another electronic device or receive a signal from the other electronic device. However, it is not limited thereto.

In operation 122, the first electronic device 110 may allocate resources to the second electronic device 120. For example, when the first electronic device 110 is a base station for cellular communication and the second electronic device 120 is a user equipment for the cellular communication, the first electronic device 110 may allocate the resource through DCI format. However, it is not limited thereto.

In operation 124, the second electronic device 120 may transmit signals using the allocated resource. For example, the second electronic device 120 may transmit the first signal in operation 124-1 using the allocated resource, transmit K-th signal in operation 124-K, and transmit N-th signal in operation 124-N.

As described above, resource allocation-based signaling may ensure communication stability between the first electronic device 110 and the second electronic device 120 as well as communication stability between the first electronic device 110 and another electronic device, since a procedure for allocating resources is required, delay may be caused.

Figure 2:
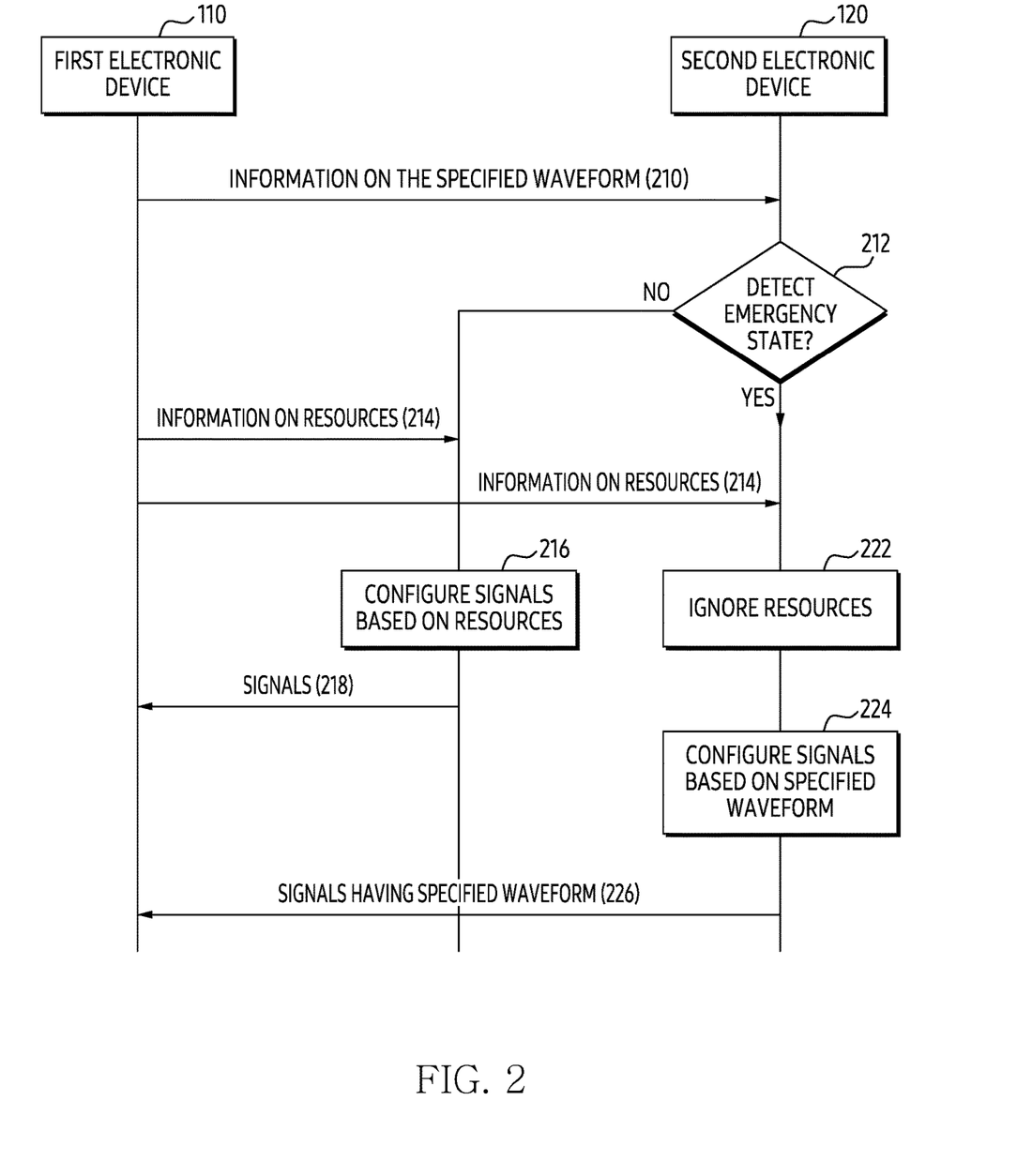
FIG. 2 illustrates an example of signaling according to various embodiments.

FIG. 2 illustrates an example of signaling according to various embodiments.

Referring to FIG. 2, the first electronic device 110 may execute communication with the second electronic device 120. For example, the first electronic device 110 may support communication with the second electronic device 120 to support communication between the second electronic device 120 and another electronic device as an upper node of the second electronic device 120. For example, the first electronic device 110 may be a base station, an access point (AP), or the like.

The second electronic device 120 may be related to a moving vehicle. For example, the second electronic device 120 may be a device (e.g., head unit) embedded in the vehicle. As another example, the second electronic device 120 may be a device (e.g., smartphone, tablet, etc.) detachably attached to the vehicle. As another example, the second electronic device 120 may be a device possessed by a guardian of a passenger of the vehicle. However, it is not limited thereto.

In various embodiments, the second electronic device 120 may be a lower node of the first electronic device 110. In various embodiments, the second electronic device 120 may use the first electronic device 110 to transmit a signal to another electronic device or receive a signal from the other electronic device. However, it is not limited thereto.

In operation 210, the first electronic device 110, which is an upper node of the second electronic device 120, may transmit information on a specified waveform to the second electronic device 120. For example, the information transmitted from the first electronic device 110 to the second electronic device 120 may be information broadcast for a plurality of electronic devices located within the coverage of the first electronic device 110. As another example, the information transmitted from the first electronic device 110 to the second electronic device 120 may be information transmitted by specifying the second electronic device 120. However, it is not limited thereto. In an embodiment, the first electronic device 110 may provide a downlink control indicator (DCI) format to the second electronic device 120. For example, the DCI format may be DCI format 0_0. As another example, the DCI format may be DCI format 0_1. As another example, the DCI format may be DCI format 0_2. As another example, the DCI format may be DCI format 1_0. As another example, the DCI format may be DCI format 1_1. As another example, the DCI format may be DCI format 1_2. However, it is not limited thereto.

In various embodiments, the information may be transmitted from the first electronic device 110 to the second electronic device 120 while establishing a communication connection between the first electronic device 110 and the second electronic device 120. In various embodiments, the information may be transmitted from the first electronic device 110 to the second electronic device 120 after establishing a communication connection between the first electronic device 110 and the second electronic device 120.

In various embodiments, the specified waveform may be used by the second electronic device 120 when the vehicle related to the second electronic device 120 is in an emergency state. The specified waveform may be distinguished from a waveform of a signal transmitted from the second electronic device 120 based on a resource allocated from the first electronic device 110 to the second electronic device 120. For example, the emergency state may mean a state in which at least some of the functions available through the vehicle or the second electronic device 120 are damaged by an external impact (e.g., accident). For example, the emergency state may mean a state in which at least some of the components of the vehicle or the second electronic device 120 malfunctions without an external impact. However, it is not limited thereto.

Meanwhile, the second electronic device 120 may receive the information on the specified waveform from the first electronic device 110.

In an embodiment, the first electronic device 110 may indicate resources to be used by the second electronic device 120 while the vehicle related to the second electronic device 120 is in the emergency state through DCI format 0_2. In an embodiment, the first electronic device 110 may indicate resources to be used by the second electronic device 120 while the vehicle related to the second electronic device 120 is in the emergency state through DCI format 1_2. However, it is not limited thereto.

In operation 212, after receiving the information on the specified waveform, the second electronic device 120 may detect whether the vehicle related to the second electronic device 120 is in an emergency situation. For example, the detection may be executed through at least one sensor related to the second electronic device 120. As another example, the detection may be executed based on a signal transmitted from a third electronic device (not shown in FIG. 2) to the second electronic device 120. However, it is not limited thereto.

In an embodiment, after identifying or recognizing the resources indicated through DCI format 0_2, the second electronic device 120 may detect whether the vehicle is in an emergency state. In an embodiment, after identifying or recognizing the resources indicated through DCI format 1_2, the second electronic device 120 may detect whether the vehicle is in an emergency state. However, it is not limited thereto.

In operation 214, the second electronic device 120 may receive information on resources from the first electronic device 110 while detecting (or identifying) that the vehicle is not in the emergency situation. The resources may be resources allocated by the first electronic device 110 to the second electronic device 120 for signals transmitted from the second electronic device 120 to the first electronic device 110. In an embodiment, information on the resources may be received through DCI format 0_0. In an embodiment, information on the resources may be received through DCI format 0_1. In an embodiment, information on the resources may be received through DCI format 1_0. In an embodiment, information on the resources may be received through DCI format 1_1. However, it is not limited thereto.

In operation 216, the second electronic device 120 may configure signals based on the resources while detecting (or identifying) that the vehicle is not in the emergency situation. For example, the second electronic device 120 may determine a transmission timing of the signals, or determine a transmission power of the signals, or determine a transmission frequency of the signals based on the resources. However, it is not limited thereto.

In an embodiment, while detecting that the vehicle is not in the emergency situation, the second electronic device 120 may configure the signals based on the resources indicated through DCI format 0_0. In an embodiment, while detecting that the vehicle is not in the emergency situation, the second electronic device 120 may configure the signals based on the resources indicated through DCI format 0_1. However, it is not limited thereto.

In operation 218, the second electronic device 120 may transmit the configured signals to the first electronic device 110. The first electronic device 110 may receive the signals based on information on the resources allocated to the second electronic device 120.

Meanwhile, in operation 222, the second electronic device 120 may ignore the resources allocated from the first electronic device 110 to the second electronic device 120 in response to detecting that the vehicle is in the emergency situation.

In operation 224, in response to detecting that the vehicle is in the emergency state, the second electronic device 120 may configure signals for indicating that the vehicle is in the emergency state based on the specified waveform, independently of the resources allocated from the first electronic device 110 to the second electronic device 120.

In one embodiment, when resources to be used while in the emergency state are indicated through DCI format 0_2, the second electronic device 120 may configure the signals for indicating that the vehicle is in the emergency state based on the resources indicated through DCI format 0_2. In one embodiment, when resources to be used while in the emergency state are indicated through DCI format 1_2, the second electronic device 120 may configure the signals for indicating that the vehicle is in the emergency state based on the resources indicated through DCI format 1_2. However, it is not limited thereto.

In operation 226, the second electronic device 120 may transmit the signals having the specified waveform to the first electronic device 110 in response to the configuration. In various embodiments, the signals having the specified waveform may be transmitted from the second electronic device 120 to the first electronic device 110 using at least some of the resources available to the second electronic device 120 in connection with communication with the first electronic device 110. For example, the signals having the specified waveform may be transmitted from the second electronic device 120 to the first electronic device 110 using all of the resources available to the second electronic device 120 in connection with communication with the first electronic device 110. However, it is not limited thereto. In various embodiments, the signals having the specified waveform may include the same information (e.g., information indicating that the vehicle is in the emergency situation). In other words, the signals may be one signal repeatedly transmitted. However, it is not limited thereto. When the signals having the specified waveform include the same information (e.g., information for indicating that the vehicle is in the emergency situation) for transmission diversity, the second electronic device 120 may transmit the signals with different transmission power.

In an embodiment, the second electronic device 120 may transmit the signals configured based on the resources indicated through DCI format 0_2 to the first electronic device 110. In an embodiment, the second electronic device 120 may transmit the signals configured based on the resources indicated through DCI format 1_2 to the first electronic device 110. However, it is not limited thereto.

In various embodiments, the first electronic device 110 may receive the signals having the specified waveform from the second electronic device 120. Since each of the signals has the specified waveform, even if the signals are received from the first electronic device 110 through at least some other resources that are distinguished from the resources allocated to the second electronic device 120, the first electronic device 110 may recognize that the signals indicate that the vehicle is in the emergency situation based on the identification of the specified waveform. In an embodiment, since each of the signals has the specified waveform, the recognition may be executed without decoding the signals.

In an embodiment, the first electronic device 110 may execute at least one operation for providing an emergency vehicle service for the vehicle based on the recognition. For example, the first electronic device 110 may request to transmit an accident notification message to another electronic device possessed by the guardian of the passenger of the vehicle, or may request the other electronic device to transmit the accident notification message to the other electronic device related to the first electronic device 110. However, it is not limited thereto. In an embodiment, the first electronic device 110 may transmit the accident notification message to the other electronic device based on resources indicated to the other electronic device through DCI format 1_2.

In an embodiment, the first electronic device 110 may receive the signals based on the resources indicated by the first electronic device 110 through DCI format 0_2. In an embodiment, the first electronic device 110 may receive the signals based on the resources indicated by the first electronic device 110 through DCI format 1_2. However, it is not limited thereto.

As described above, the first electronic device 110 according to various embodiments may provide an emergency situation notification service with high reliability and low latency by providing information on a specified waveform for a transmission signal for notifying an emergency to the second electronic device 120. The second electronic device 120 according to various embodiments may provide an emergency situation notification service with high reliability and low latency by configuring a signal using the specified waveform and transmitting the signal having the specified waveform to the first electronic device 11 based on the above configuration.

Figure 3:
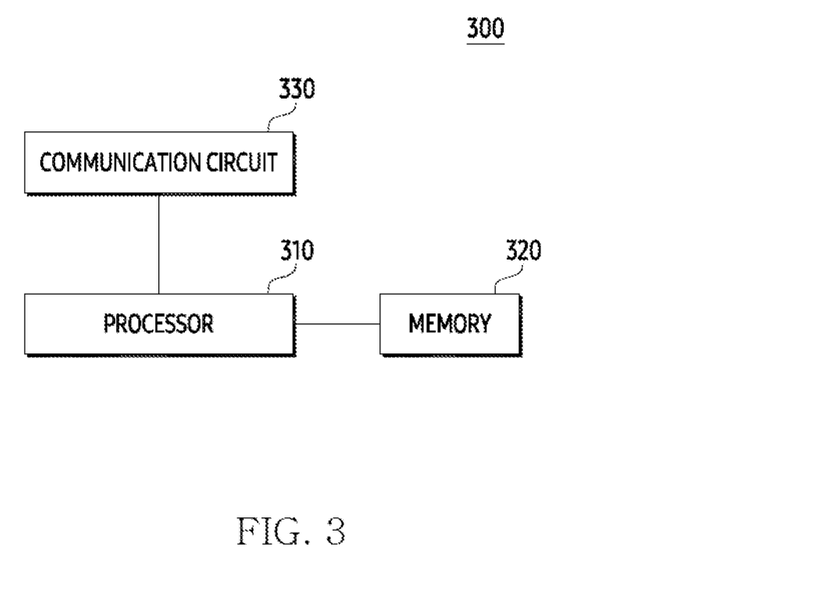
FIG. 3 is a simplified block diagram of an electronic device according to various embodiments.

FIG. 3 is a simplified block diagram of an electronic device according to various embodiments. Such a simplified block diagram may represent functional configurations of the first electronic device 110 and the second electronic device 120 in FIG. 2.

Referring to FIG. 3, the electronic device 300 may include a processor 310, a memory 320, and a communication circuit 330.

The processor 310 may control the overall operation of the electronic device 300. In various embodiments, the processor 310 may include a single core or may include a plurality of processor cores. For example, the processor 310 may include a multi-core such as a dual-core, a quad-core, and a hexa-core. According to embodiments, the processor 310 may further include a cache memory located inside or outside.

The processor 310 may receive commands of other components of the electronic device 300, may interpret the received commands, and may perform calculations or process data according to the interpreted commands.

The processor 310 may process data or signals created or generated in a program. For example, the processor 310 may request an instruction, command, data, or signal from the memory 320 to execute or control a program. The processor 310 may record (or store) or update an instruction, command, data, or signal to the memory 320 in order to execute or control the program.

The processor 310 may interpret and process messages, instructions, data, commands, or signals received from the memory 320 or the communication circuit 330. The processor 310 may generate a new message, data, command, or signal based on the received message, data, command, or signal. The processor 310 may provide a processed or generated message, data, command, or signal to the memory 320 or the communication circuit 330.

All or part of the processor 310 may be electrically or operatively coupled with or connected to other components (for example, the memory 320 or the communication circuit 330) in the electronic device 300.

According to embodiments, the processor 310 may be configured with one or more processors. For example, the processor 310 may include at least one of an application processor, a communication processor, a graphical processing unit (GPU), or a sensor hub. In various embodiments, processor 310 may be configured to execute the operations illustrated through FIGS. 1 to 2.

The memory 320 may store instructions, commands, control command codes, control data, or user data for controlling the electronic device 300. For example, the memory 320 may include at least one of an application program, an operating system (OS) middleware, or a device driver.

The memory 320 may include at least one of a volatile memory and a non-volatile memory. Volatile memory may include dynamic random access memory (DRAM), static RAM (SRAM), synchronous DRAM (SDRAM), phase-change RAM (PRAM), magnetic RAM (MRAM), resistive RAM (RRAM), and ferroelectric RAM (FeRAM). The nonvolatile memory may include a read only memory (ROM), a programmable ROM (PROM), an electrically programmable ROM (EPROM), an electrically erasable programmable ROM (EEPROM), flash memory (flash memory) and the like.

The memory 320 may further include nonvolatile medium such as a hard disk drive (HDD), a solid state disk (SSD), an embedded multi-media card (eMMC), and a universal flash storage (UFS).

The communication circuit 330 may support establishment of a wired or wireless communication channel between the electronic device 300 and the external electronic device and performance of communication through the established communication channel. According to an embodiment, the communication circuit 330 includes a wireless communication circuit (e.g., cellular communication circuit, a short-range wireless communication circuit, or a global navigation satellite system (GNSS) communication circuit) or a wired communication circuit (e.g. a local area network (LAN) communication circuit or a power line communication circuit), may communicate with an external electronic device through a first network (e.g., Short-range communication networks such as near field communication (NFC), wireless power transfer (WPT), magnetic secure transmission (MST), Bluetooth, Wi-Fi direct, or infrared data assistance (IrDA)) or a second network (e.g., long-distance communication networks such as cellular networks, Internet, or computer networks (e.g., LAN or WAN)) using a corresponding communication circuit. The above-described various types of communication circuits 330 may be implemented as one chip or may be implemented as separate chips.

In various embodiments, the communication circuit 330 may be operatively coupled to the processor 310.

As described above, the first electronic device according to various embodiments may comprise a communication circuitry, and a memory configured to store instructions, and at least one processor operatively coupled with the communication circuitry; wherein the at least one processor may be, when the instructions are executed, configured to receive, from a second electronic device that is an upper node of the first electronic device, information regarding a specified waveform; while detecting that a vehicle associated with the first electronic device is not in an emergency state after receiving the information, transmit, to the second electronic device, a signal based on resources allocated from the second electronic device; and in response to detecting that the vehicle is in the emergency state after receiving the information, transmit, to the second electronic device, a signal with the specified waveform independently from the allocated resources, wherein the signal with the specified waveform includes information for notifying that the vehicle is in the emergency state.

In an embodiment, the resources allocated from the second electronic device may be instructed to the first electronic device through a downlink control indicator (DCI) format 0_0.

In an embodiment, the resources allocated from the second electronic device may be instructed to the first electronic device through DCI format 0_1.

In an embodiment, the information on the specified waveform may be information broadcast from the second electronic device for a plurality of electronic devices located within coverage of the second electronic device.

In an embodiment, the information on the specified waveform may be indicated through DCI format 0_2.

In an embodiment, the signal having the specified waveform may cause the second electronic device to transmit an accident notification message to another electronic device distinguished from the first electronic device and the second electronic device.

In an embodiment, the signal transmitted based on the resources allocated from the first electronic device may have another waveform distinguished from the specified waveform.

As described above, according to an embodiment, the first electronic device may include a communication circuit and a memory configured to store instructions and at least one processor operatively coupled with the communication circuitry; wherein the at least one processor may be, when the instructions are executed, configured to: receive, from a second electronic device that is a upper node of the first electronic device, a downlink control indicator (DCI) format 0_0, a DCI format 0_1, and a DCI format 0_2; while detecting that a vehicle associated with the first electronic device is not in an emergency state after receiving the DCI format 0_0, the DCI format 0_1, and the DCI format 0_2, transmit, to the second electronic device, a first signal based on resources indicated via the DCI format 0_0 or the DC1 format 0_1 from among the DCI format 0_0, the DCI format 0_1, and the DCI format 0_2; and in response to detecting that the vehicle is in the emergency state after receiving the DCI format 0_0, the DCI format 0_1, and the DCI format 0_2, transmit, to the second electronic device, a second signal based on resources indicated via the DCI format 0_2 from among the DCI format 0_0, the DCI for mat 0_1, and the DCI format 0_2, wherein the second signal includes information for notifying that the vehicle is in the emergency state.

In an embodiment, the second signal may have a specified waveform.

In an embodiment, the specified waveform of the second signal may be distinguished from the waveform of the first signal.

In an embodiment, the second signal including the information for notifying that the vehicle is in the emergency situation may be recognized by the second electronic device without decoding the second signal.

In one configuration, the at least one processor may be configured to repeatedly transmit the second signal to the second electronic device when executing the instructions. In one configuration, the at least one processor may be, when the instructions are executed, configured to repeatedly transmit the second signal to the second electronic device by transmitting the second signal with a first transmit (Tx) power to the second electronic device and transmitting the second signal with a second Tx power distinct from the first Tx power to the second electronic device after transmitting the second signal With the first Tx power.

In an embodiment, the DCI format 0_2 may be transmitted after a communication connection between the first electronic device and the second electronic device is established.

As described above, according to an embodiment, the method for operating an electronic device having a communication circuit may comprise: receiving, from a second electronic device that is an upper node of the first electronic device, information regarding a specified waveform; while detecting that a vehicle associated with the first electronic device is not in an emergency state after receiving the information, transmitting, to the second electronic device, a signal based on resources allocated from the second electronic device; and in response to detecting that the vehicle is in the emergency state after receiving the information, transmitting, to the second electronic device, a signal with the specified waveform independently from the Allocated resources, wherein the signal with the specified waveform includes information for notifying that the vehicle is in the emergency state.

As described above, the method for operating an electronic device having a communication circuit according to an embodiment may include an operation of receiving a downlink control indicator (DCI) form 0_0, a DCI form 0_1, and a DCI format 0_2 from a second electronic device, which is an upper node of the first electronic device and, after receiving the DCI format 0_0, DCI format 0_1, and DCI format 0_2, while detecting that the vehicle related to the first electronic device is not in an emergency situation, an operation of transmitting a first signal to the second electronic device based on resources indicated through DCI format 0_0 or DCI format 0_1 among DCI format 0_0, DCI format 0_1, and DCI format 0_2 and, after receiving the DCI format 0_0, DCI format 0_1, and DCI format 0_2, in response to detecting that the vehicle is in the emergency situation, an operation of transmitting a second signal to the second electronic device based on the resources indicated through DCI format 0_2; wherein the second signal may include information for notifying that the vehicle is in the emergency situation.

Methods according to the embodiments described in the claims or specifications of the present disclosure may be implemented in the form of hardware, software, or a combination of hardware and software.

When implemented as software, a computer-readable storage medium may be provided that stores one or more programs (software modules). One or more programs stored in the computer-readable storage medium are configured for execution by one or more processors in an electronic device. One or more programs include instructions that cause the electronic device to execute the methods according to the embodiments described in the claims or specification of the present disclosure.

These programs (software modules, Software) may be stored in random access memory, non-volatile memory including flash memory, ROM (Read Only Memory), and electrically erasable Read Only Memory (EEPROM), magnetic disk storage device, Compact Disc-ROM (CD-ROM), Digital Versatile Disks (DVDs), or other forms of optical storage, magnetic cassette. Alternatively, it may be stored in a memory composed of a combination of some or all of them. In addition, each configuration memory may be included in plurality.

In addition, the program may be stored in a communication network such as the Internet, air intranet, a local area network (LAN), a wide LAN (WLAN), or a storage area network (SAN); or an attachable storage device that can be accessed through a communication network composed of a combination thereof. Such a storage device may access a device performing an embodiment of the present disclosure through an external port. In addition, a separate storage device on the communication network may access a device performing an embodiment of the present disclosure.

In specific embodiments of the present disclosure described above, the components included in the disclosure have been expressed in a single or plural number according to the specific embodiments presented. However, singular or plural expressions are selected appropriately for the situation presented for convenience of explanation, and the present disclosure is not limited to singular or plural components and even if it is a component expressed in plural, it may consist of a single number, or even if it is a component expressed in a single number, it may consist of a plurality.

Meanwhile, detailed embodiments have been described in the detailed description of the present disclosure, but it goes without saying that various modifications are possible within the limit not departing from the scope of the present disclosure. Therefore, the scope of the present disclosure should not be limited to the described embodiments, but should be determined by the scope of the patent claim to be described later as well as those equivalent to the scope of the patent claim.

The invention claimed is:

1. A first electronic device comprising:
a communication circuitry;
a memory configured to store instructions; and
at least one processor operatively coupled with the communication circuitry,
wherein the at least one processor is, when the instructions are executed, configured to:
receive, from a second electronic device that is an upper node of the first electronic device, a downlink control indicator (DCI) format 0_0, a DCI format 0_1, and a DCI format 0_2;
while detecting that a vehicle associated with the first electronic device is not in an emergency state after receiving the DCI format 0_0, the DCI format 0_1, and the DCI format 0_2, transmit, to the second electronic device, a first signal based on resources indicated via the DCI format 0_0 or the DCI format 0_1 from among the DCI format 0_0, the DCI format 0_1, and the DCI format 0_2; and
in response to detecting that the vehicle is in the emergency state after receiving the DCI format 0_0, the DCI format 0_1, and the DCI format 0_2, transmit, to the second electronic device, a second signal based on resources indicated via the DCI format 0_2 from among the DCI format 0_0, the DCI format 0_1, and the DCI format 0_2, wherein the second signal includes information for notifying that the vehicle is in the emergency state.

2. The first electronic device of claim 1, wherein the second signal has a specified waveform.

3. The first electronic device of claim 2, wherein the specified waveform of the second signal is distinct from a waveform of the first signal.

4. The first electronic device of claim 1, wherein the second signal including the information for notifying that the vehicle is in the emergency state is recognized by the second electronic device without decoding the second signal.

5. The first electronic device of claim 1, wherein the at least one processor is, when the instructions are executed, configured to repeatedly transmit the second signal to the second electronic device.

6. The first electronic device of claim 5, wherein the at least one processor is, when the instructions are executed, configured to repeatedly transmit the second signal to the second electronic device by transmitting the second signal with a first transmit (Tx) power to the second electronic device and transmitting the second signal with a second Tx power distinct from the first Tx power to the second electronic device after transmitting the second signal with the first Tx power.

7. The first electronic device of claim 1, wherein the DCI format 0_2 is transmitted after a communication connection between the first electronic device and the second electronic device is established.

8. A method for operating a first electronic device comprising a communication circuitry, a memory configured to store instructions and at least one processor operatively coupled with the communication circuitry, the method comprising:

receiving, from a second electronic device that is an upper node of the first electronic device, a downlink control indicator (DCI) format 0_0, a DCI format 0_1, and a DCI format 0_2;
while detecting that a vehicle associated with the first electronic device is not in an emergency state after receiving the DCI format 0_0, the DCI format 0_1, and the DCI format 0_2, transmitting, to the second electronic device, a first signal based on resources indicated via the DCI format 0_0 or the DCI format 0_1 from among the DCI format 0_0, the DCI format 0_1, and the DCI format 0_2; and
in response to detecting that the vehicle is in the emergency state after receiving the DCI format 0_0, the DCI format 0_1, and the DCI format 0_2, transmitting, to the second electronic device, a second signal based on resources indicated via the DCI format 0_2 from among the DCI format 0_0, the DCI format 0_1, and the DCI format 0_2, wherein the second signal includes information for notifying that the vehicle is in the emergency state.

9. The method of claim 8, wherein the second signal has a specified waveform.

10. The method of claim 9, wherein the specified waveform of the second signal is distinct from a waveform of the first signal.

11. The method of claim 8, wherein the second signal including the information for notifying that the vehicle is in the emergency state is recognized by the second electronic device without decoding the second signal.

12. The method of claim 8, comprising:
repeatedly transmitting the first signal to the second electronic device.

13. The method of claim 12, comprising:
repeatedly transmitting the second signal to the second electronic device by transmitting the second signal with a first transmit (Tx) power to the second electronic device and transmitting the second signal with a second Tx power distinct from the first Tx power to the second electronic device after transmitting the second signal with the first Tx power.

14. The method of claim 8, wherein the DCI format 0_2 is transmitted after a communication connection between the first electronic device and the second electronic device is established.

15. A non-transitory computer-readable storage medium storing one or more programs, wherein the one or more programs, when executed by a first electronic device comprising a communication circuity, a memory configured to store instructions and at least one processor operatively coupled with the communication circuity, are configured to cause the first electronic device to:
receive, from a second electronic device that is an upper node of the first electronic device, a downlink control indicator (DCI) format 0_0, a DCI format 0_1, and a DCI format 0_2;
while detecting that a vehicle associated with the first electronic device is not in an emergency state after receiving the DCI format 0_0, the DCI format 0_1, and the DCI format 0_2, transmit, to the second electronic device, a first signal based on resources indicated via the DCI format 0_0 or the DCI format 0_1 from among the DCI format 0_0, the DCI format 0_1, and the DCI format 0_2; and
in response to detecting that the vehicle is in the emergency state after receiving the DCI format 0_0, the DCI format 0_1, and the DCI format 0_2, transmit, to the second electronic device, a second signal based on resources indicated via the DCI format 0_2 from among the DCI format 0_0, the DCI format 0_1, and the DCI format 0_2, wherein the second signal includes information for notifying that the vehicle is in the emergency state.

16. The non-transitory computer-readable storage medium of claim 15, wherein the second signal has a specified waveform.

17. The non-transitory computer-readable storage medium of claim 16, wherein the specified waveform of the second signal is distinct from a waveform of the first signal.

18. The non-transitory computer-readable storage medium of claim 15, wherein the second signal including the information for notifying that the vehicle is in the emergency state is recognized by the second electronic device without decoding the second signal.

19. The non-transitory computer-readable storage medium of claim 15, wherein the one or more programs, when executed by the first electronic device, are configured to cause the first electronic device to repeatedly transmit the first signal to the second electronic device.

20. The non-transitory computer-readable storage medium of claim 15, wherein the one or more programs, when executed by the first electronic device, are configured to cause the first electronic device to repeatedly transmit the second signal to the second electronic device by transmitting the second signal with a first transmit (Tx) power to the second electronic device and transmitting the second signal with a second Tx power distinct from the first Tx power to the second electronic device after transmitting the second signal with the first Tx power.

* * * * *